US012769979B2

(12) United States Patent
Chen

(10) Patent No.: US 12,769,979 B2
(45) Date of Patent: Oct. 20, 2026

(54) ARTIFICIAL INTELLIGENCE PLANNING METHOD AND ARTIFICIAL INTELLIGENCE PLANNING DEVICE

(71) Applicant: Wistron Corporation, New Taipei City (TW)

(72) Inventor: Chih-Ming Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 926 days.

(21) Appl. No.: 17/530,479

(22) Filed: Nov. 19, 2021

(65) Prior Publication Data

US 2023/0111791 A1 Apr. 13, 2023

(30) Foreign Application Priority Data

Oct. 13, 2021 (TW) ................................ 110137963

(51) Int. Cl.
*G06N 3/04* (2023.01)
*H04L 41/14* (2022.01)

(52) U.S. Cl.
CPC ............ *G06N 3/04* (2013.01); *H04L 41/145* (2013.01)

(58) Field of Classification Search
CPC ................................ G06N 3/04; H04L 41/145
See application file for complete search history.

(56) References Cited

U.S. PATENT DOCUMENTS 10,769,525 B2 * 9/2020 Redding .................. G06N 5/01
11,012,872 B1 5/2021 Bellamkonda et al.
(Continued)

FOREIGN PATENT DOCUMENTS

CN 113766576 12/2021
KR 102008367 8/2019
(Continued)

OTHER PUBLICATIONS

ETSI, "Multi-access Edge Computing—Standards for MEC", retrieved on Oct. 22, 2021, Available at:https://www.etsi.org/technologies/multi-access-edge-computing?j=1623674270961, pp. 1-6.
(Continued)

*Primary Examiner* — Li B. Zhen
*Assistant Examiner* — Tirumale K Ramesh
(74) *Attorney, Agent, or Firm* — JCIPRNET

(57) ABSTRACT

An artificial intelligence planning method and an artificial intelligence planning device are provided. When a considered specific application has a plurality of planning layers, a corresponding planning node set and a planning tree are built for each of the planning layers according to a domain file, and all planning nodes in the planning node set of each of the planning layers satisfy a plurality of corresponding preset conditions. In addition, a corresponding planning path may be determined in each of the planning trees, and a plurality of action commands may be accordingly issued to the specific application to achieve a corresponding target state. In this way, the specific application having multiple planning layers may be equipped with self-configuration, self-optimizing, and self-healing functions and is then implemented as a self-organizing application.

21 Claims, 7 Drawing Sheets

(56) References Cited

U.S. PATENT DOCUMENTS

| | | | | |
|---|---|---|---|---|
| 12,147,920 | B2 * | 11/2024 | Fox | G06Q 10/0633 |
| 2015/0046216 | A1 * | 2/2015 | Adjaoute | G06Q 20/384 705/7.29 |
| 2018/0089563 | A1 | 3/2018 | Redding et al. | |
| 2018/0314942 | A1 * | 11/2018 | Shinn | A63F 13/67 |
| 2019/0180187 | A1 | 6/2019 | Rawal et al. | |
| 2019/0310627 | A1 * | 10/2019 | Halder | G05D 1/0033 |
| 2020/0103866 | A1 | 4/2020 | Menzel et al. | |
| 2020/0175443 | A1 | 6/2020 | Fox et al. | |
| 2020/0267053 | A1 | 8/2020 | Zheng et al. | |
| 2021/0142197 | A1 * | 5/2021 | Katz | G06N 7/01 |
| 2021/0144517 | A1 | 5/2021 | Guim Bernat et al. | |
| 2021/0264480 | A1 * | 8/2021 | Silverstein | G06F 16/951 |
| 2021/0266781 | A1 * | 8/2021 | Alkurd | H04L 41/40 |
| 2021/0279602 | A1 | 9/2021 | Latapie et al. | |
| 2022/0284307 | A1 * | 9/2022 | McQueary, III | G06N 5/04 |
| 2025/0238673 | A1 | 7/2025 | Commons | |

FOREIGN PATENT DOCUMENTS

| | | |
|---|---|---|
| TW | 202131661 | 8/2021 |
| WO | 2019094729 | 5/2019 |

OTHER PUBLICATIONS

Malte Helmert, "An Introduction to PDDL", Available at:https://www.cs.toronto.edu/~sheila/2542/s14/A1/introtopddl2.pdf, pp. 1-15.

Kory Becker, "Artificial Intelligence Planning with STRIPS, A Gentle Introduction", retrieved on Nov. 6, 2015, Available at:http://www.primaryobjects.com/2015/11/06/artificial-intelligence-planning-with-strips-a-gentle-introduction/, pp. 1-38.

CLG+ Contingent Planner, "Artificial Intelligence and Machine Learning Research group", retrieved on Oct. 22, 2021, Available at:https://www.upf.edu/web/ai-ml/clg-contingent-planner1, p. 1.

"Online Replanning", Section 11.3.3, Available at: https://pages.mtu.edu/~nilufer/classes/cs5811/2012-fall/lecture-slides/cs5811-ch11d-replan.pdf, pp. 1-18.

Anirudh Goyal, et al., "Recurrent Independent Mechanisms", arXiv.org > cs > arXiv:1909.10893, retrieved on Sep. 24, 2019, Available at: https://arxiv.org/abs/1909.10893, pp. 1-35.

"Office Action of Taiwan Related Application No. 111109714", issued on Oct. 11, 2022, pp. 1-5.

"Office Action of Taiwan Counterpart Application", issued on Jul. 21, 2022, pp. 1-11.

"Search Report of Europe Counterpart Application", issued on Aug. 9, 2022, pp. 1-13.

"Office Action of Taiwan Related Application No. 111108574", issued on Dec. 9, 2022, p. 1-p. 10.

Mu Yan et al., "Intelligent Resource Scheduling for 5G- Radio Access Net\vork Slicing", IEEE Transactions on Vehicular Technology, August 2019, pp. 7691-7703, vol. 68, No. 8.

Aditya Chattopadhyay et al., "Neural Network Attributions: A Causal Perspective", Proceedings of the 36th International Conference on Machine Learning, 2019, pp. 1-10, vol. 97.

Junzhe Zhang et al., "Markov Decision Processes with Unobserved Confounders: A Causal Approach", Computer Science, Medicine, Sep. 19, 2016, pp. 1-40.

Sławomir Kukliński et al., "On O-RAN, MEC, SON and Network Slicing integration", 2020 IEEE Globecom Workshops (GC Wkshps, Dec. 7, 2020, pp. 1-6.

Huang Baojiao, "Cognitive-Based Network Reconfiguration Reasoning and Decision-Making Technology in Mobile Ad Hoc Networks," Master's thesis, Jun. 2008, Communication and Information System, University of Electronic Science and Technology of China.

Shao-Chou Hung et al., "Delay Guaranteed Network Association for Mobile Machines in Heterogeneous Cloud Radio Access Network", IEEE Transactions on Mobile Computing, Mar. 14, 2018, pp. 2744-4760, vol. 17, No. 12.

* cited by examiner

ARTIFICIAL INTELLIGENCE PLANNING METHOD AND ARTIFICIAL INTELLIGENCE PLANNING DEVICE

CROSS-REFERENCE TO RELATED APPLICATION

This application claims the priority benefit of Taiwan application serial no. 110137963, filed on Oct. 13, 2021. The entirety of the above-mentioned patent application is hereby incorporated by reference herein and made a part of this specification.

BACKGROUND

Technical Field

The disclosure relates to an artificial intelligence (AI) technology, and in particular, relates to an artificial intelligence planning method and an artificial intelligence planning device.

Description of Related Art

In the fifth-generation communication system (hereinafter referred to as 5G), the multi-access edge computing (MEC) is the natural development of the evolution of mobile base stations and the integration between information technology and telecommunication networks. MEC is expected to provide consumers as well as corporate customers with new services, such as video analysis, location services, Internet of Things (IoT), augmented reality, optimized local content distribution, and data caching.

MEC allows software applications to take advantage of local content and real-time information related to local access network conditions. By deploying various services and caching content at the edge of the network, the congestion of the mobile core network may be further alleviated, and local purposes may be effectively served.

The deployment of MEC industry standards and the MEC platform will become the promoters of new revenue streams for operators, suppliers, and third-party vendors. Differentiation will be achieved through specific applications deployed in the edge cloud.

In the related art, a self-organizing network capable of providing self-configuration, self-optimizing, and self-healing of the 5G network is defined in 5G.

However, 5G does not provide the self-organizing function for applications on the MEC system. That is because the applications on the MEC system need to be customized for their user groups, unlike the conventional public cloud applications that may be applied as one-size-for-all, and the manual development and maintenance costs of the applications on the MEC system thereby grow significantly as a result.

SUMMARY

Accordingly, the disclosure provides an artificial intelligence planning method and an artificial intelligence planning device configured to solve the foregoing technical problems.

The disclosure provides an artificial intelligence planning method, and the method includes the following steps. A problem file and a domain file associated with a specific application are obtained. The domain file includes N description segments corresponding to N planning layers of the specific application, and N is a positive integer greater than 1. The problem file indicates a first initial state and a target state of each of the planning layers. N planning trees corresponding to the planning layers are constructed based on the description segments. Each of the planning trees has a plurality of state nodes and corresponds to one of the planning layers. Each of the planning layers has a planning node set, and the planning node set of each of the planning layers includes a plurality of planning nodes. The planning nodes of an $i^{th}$ planning layer among the planning layers include a first planning node. The planning nodes of an $i+1^{th}$ planning layer among the planning layers include a plurality of second planning nodes corresponding to the first planning node. The first planning node satisfies a plurality of first preset conditions corresponding to the $i^{th}$ planning layer. All of the planning nodes of a second planning tree satisfy a plurality of second preset conditions of the $i+1^{th}$ layer, where i is a positive integer and $N>i\geq 1$. A first planning path is determined in the planning nodes of each of the planning trees based on a deep learning model. The first planning path of each of the planning trees guides the corresponding planning layer from the corresponding first initial state to the corresponding target state. A first scheduling plan is generated according to the first planning path of a specific planning tree among the N planning trees, and a plurality of action commands are sequentially issued to the specific application accordingly.

The disclosure further provides an artificial intelligence planning device including a storage circuit and a processor. The storage circuit stores a program code. The processor is coupled to the storage circuit and accesses the program code for executing the operations provided as follows. A problem file and a domain file associated with a specific application are obtained. The domain file includes N description segments corresponding to N planning layers of the specific application, and N is a positive integer greater than 1. The problem file indicates a first initial state and a target state of each of the planning layers. N planning trees corresponding to the planning layers are constructed based on the description segments. Each of the planning trees has a plurality of state nodes and corresponds to one of the planning layers. Each of the planning layers has a planning node set, and the planning node set of each of the planning layers includes a plurality of planning nodes. The planning nodes of an $i^{th}$ planning layer among the planning layers include a first planning node. The planning nodes of an $i+1^{th}$ planning layer among the planning layers include a plurality of second planning nodes corresponding to the first planning node. The first planning node satisfies a plurality of first preset conditions corresponding to the $i^{th}$ planning layer. All of the planning nodes of a second planning tree satisfy a plurality of second preset conditions of the $i+1^{th}$ layer, where i is a positive integer and $N>i\leq 1$. A first planning path is determined in the planning nodes of each of the planning trees based on a deep learning model. The first planning path of each of the planning trees guides the corresponding planning layer from the corresponding first initial state to the corresponding target state. A first scheduling plan is generated according to the first planning path of a specific planning tree among the N planning trees, and a plurality of action commands are sequentially issued to the specific application accordingly.

The disclosure further provides an artificial intelligence planning method, and the method includes the following steps. A problem file and a domain file associated with a specific application are obtained. The domain file includes N description segments corresponding to N planning layers of the specific application, and N is a positive integer greater than or equal to 1. The problem file indicates a first initial state and a target state of each of the planning layers. N planning trees corresponding to the planning layers are constructed based on the description segments. Each of the planning trees has a plurality of state nodes and corresponds to one of the planning layers. A first planning path is determined in the state nodes of each of the planning trees based on a deep learning model. The first planning path of each of the planning trees guides the corresponding planning layer from the corresponding first initial state to the corresponding target state. A first scheduling plan is generated according to the first planning path of a specific planning tree among the N planning trees, and a plurality of action commands are sequentially issued to the specific application accordingly. An operation observation generated by the specific application in response to a first action command among the action commands is obtained. The operation observation of the specific application is converted into an execution state. In response to determining that the execution state of the specific application indicates that a new scheduling plan is required to be generated, a second initial state is determined based on the execution state of the specific application, and a second planning path is determined in the state nodes of each of the planning trees based on the deep learning model. The second planning path of each of the planning trees guides the corresponding planning layer from the corresponding second initial state to the corresponding target state. According to the second planning path of the specific planning tree among the N planning trees, a second scheduling plan is generated, and a plurality of other action commands are sequentially issued to the specific application accordingly.

The disclosure further provides an artificial intelligence planning device including a storage circuit and a processor. The storage circuit stores a program code. The processor is coupled to the storage circuit and accesses the program code for executing the operations provided as follows. A problem file and a domain file associated with a specific application are obtained. The domain file includes N description segments corresponding to N planning layers of the specific application, and N is a positive integer greater than or equal to 1. The problem file indicates a first initial state and a target state of each of the planning layers. N planning trees corresponding to the planning layers are constructed based on the description segments. Each of the planning trees has a plurality of state nodes and corresponds to one of the planning layers. A first planning path is determined in the state nodes of each of the planning trees based on a deep learning model. The first planning path of each of the planning trees guides the corresponding planning layer from the corresponding first initial state to the corresponding target state. A first scheduling plan is generated according to the first planning path of a specific planning tree among the N planning trees, and a plurality of action commands are sequentially issued to the specific application accordingly. An operation observation generated by the specific application in response to a first action command among the action commands is obtained. The operation observation of the specific application is converted into an execution state. In response to determining that the execution state of the specific application indicates that a new scheduling plan is required to be generated, a second initial state is determined based on the execution state of the specific application, and a second planning path is determined in the state nodes of each of the planning trees based on the deep learning model. The second planning path of each of the planning trees guides the corresponding planning layer from the corresponding second initial state to the corresponding target state. According to the second planning path of the specific planning tree among the N planning trees, a second scheduling plan is generated, and a plurality of other action commands are sequentially issued to the specific application accordingly.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
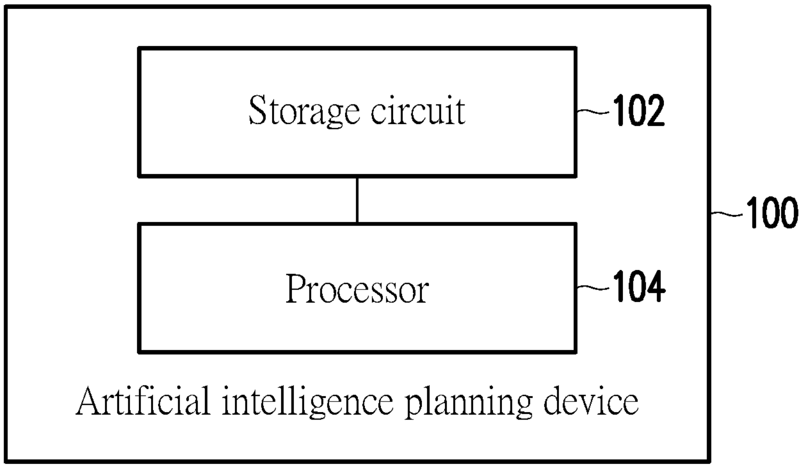
FIG. 1A is a schematic diagram illustrating an artificial intelligence planning device according to an embodiment of the disclosure.
Figure 1B:
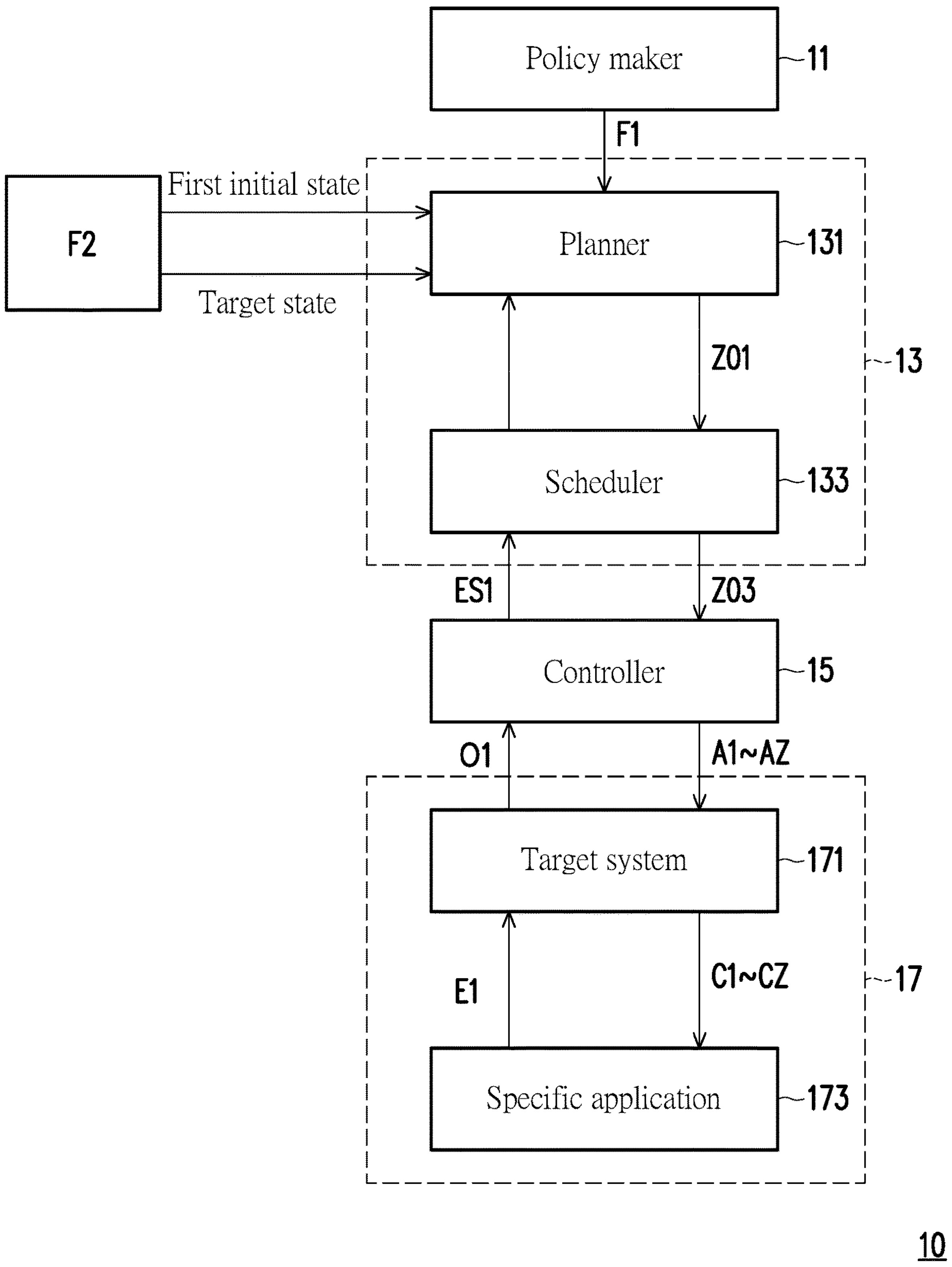
FIG. 1B is a schematic diagram illustrating an artificial intelligence planning system according to an embodiment of the disclosure.

With reference to FIG. 1A and FIG. 1B, FIG. 1A is a schematic diagram illustrating an artificial intelligence planning device according to an embodiment of the disclosure, and FIG. 1B is a schematic diagram illustrating an artificial intelligence planning system according to an embodiment of the disclosure.

In different embodiments, an artificial intelligence planning device 100 in FIG. 1A may be various types of intelligent devices, computer devices, and/or servers, but it is not limited thereto. In different embodiments, the artificial intelligence planning device 100 in FIG. 1A may be deployed on an application side, an edge cloud, and/or the cloud.

As shown in FIG. 1A, the artificial intelligence planning device 100 includes a storage circuit 102 and a processor 104. The storage circuit 102 is a fixed or a movable random access memory (RAM) in any form, a read-only memory (ROM), a flash memory, a hard disc, other similar devices, or a combination of the foregoing devices, for example, and may be used to record a plurality of program codes or modules.

The processor 104 is coupled to the storage circuit 102 and may be a processor for general use, a processor for special use, a conventional processor, a digital signal processor, a plurality of microprocessors, one or a plurality of microprocessors combined with a digital signal processor core, a controller, a microcontroller, an application specific integrated circuit (ASIC), a field programmable gate array (FPGA) circuit, an integrated circuit of any other types, a state machine, a processor based on an advanced RISC machine (ARM), and the like.

As shown in FIG. 1B, the artificial intelligence planning system 10 may include an artificial intelligence planner (AI planner) 13, a controller 15, and a target server 17. In some embodiments, the target server 17 may be an MEC server, which may include an illustrated target system 171 (e.g., an MEC system), and a specific application 173 may run on the target server 17.

In the embodiments of the disclosure, the processor 104 may access the modules and program codes recorded in the storage circuit 102 to implement the functions and operations provided by the artificial intelligence planner 13/controller 15 in FIG. 1B, and description thereof is provided in detail in the following paragraphs.

Generally, the work of converting a user requirement into a software requirement specification (SRS) is performed manually. One user requirement may be converted into one or a plurality of technical requirements in the SRS. However, after the SRS is obtained, an architecture, a design, and coding of a target application are automatically adjusted by AI most of the time. For ease of description, in the following paragraphs, it is assumed that the target application is the specific application 173 in FIG. 1B, but it is not limited thereto.

In the technical requirements of the SRS, a functional requirement and a non-functional requirement may be included. In the functional requirement, a function may be presented by a combination of an input, a behavior, and an output. The functional requirement may be computation, technical details, data processing, or other content that describes the function expected to be achieved by the system. The "behavior" herein may be represented by a control flow graph, a data flow graph, a call graph, and a constraint graph.

The non-functional requirement imposes restrictions on design and implementation, such as maintainability, extensibility, simplicity, understandability, re-usability, performance, etc., and these restrictions may be called as metrics.

In some embodiments, the control flow graph, data flow graph, call graph, and constraint graph in the functional requirement may be used to describe a corresponding partial program architecture (which may be understood as an architecture of the specific application 173), and a mapping relationship may be presented as a formula of "(control flow graph, data flow graph, call graph, constraint graph)→architecture pattern". That is, a tuple of one functional requirement may be mapped to an architecture pattern.

Similarly, the control flow graph, data flow graph, call graph, and constraint graph in the functional requirement may also be used to describe a corresponding partial program design and coding (which may be understood as a design and coding of the specific application 173), and the mapping relationships may be respectively presented as "(control flow graph, data flow graph, call graph, constraint graph)→design pattern" and "(control flow graph, data flow graph, call graph, constraint graph)→code pattern". That is, the tuple of one functional requirement may be mapped to a design pattern and a code pattern.

In an embodiment, the technical requirement in the SRS may be treated as a goal of a planner 131 in the artificial intelligence planner 13. In an embodiment, a policy maker 11 may generate a domain file F1 in a problem domain independent heuristic method based on a planning domain definition language (PDDL) and inputs the domain file F1 to the planner 131.

Generally, content of a conventional domain file with only a single planning layer usually includes one description segment, and the description segment may include a plurality of description sentences listed as examples as follows:

precond_1->action_1->effect_1
precond_2->action_2->effect_2
precond_n->action_n->effect_n, where the meaning of each description sentence is "entering a result state effect_i after a pre-state precond_i executes a specific action command action_i".

In the embodiments of the disclosure, a specific application 173 may include N planning layers, where N is a positive integer. For ease of description, in the following, it is assumed that the specific application 173 may include three planning layers (that is, N is 3): an architecture layer, a design layer, and a code layer, but it is only used as an example and is not intended to limit possible implementation of the disclosure. In other embodiments, a designer may adjust the numerical value of N according to needs, and the numerical value of N is not limited to the example provided above.

Correspondingly, in the embodiments of the disclosure, the domain file F1 may include N description segments corresponding to the N planning layers (i.e., the architecture layer, the design layer, and the code layer). In this case, the domain file F1 may have content as exemplified below.

[Architecture]
precond_arch_1->action_arch_1->effect_arch_1
precond_arch_2->action_arch_2->effect_arch_2
precond_arch_n->action_arch_n->effect_arch_n
[design]
precond_desn_1->action_desn_1->effect_desn_1
precond_desn_2->action_desn_2->effect_desn_2
precond_desn_n->action_desn_n->effect_desn_n
[code]
precond_code_1->action_code_1->effect_code_1
precond_code_2->action_code_2->effect_code_2
precond_code_n->action_code_n->effect_code_n In an embodiment, action_arch_i belonging to the architecture layer may include "add architecture pattern" and "remove architecture pattern". Further, "state effect_arch_i" refers to an architecture pattern set which is formed after adding/removing a system. In some embodiments, if the technical requirement is adjusted, a new architecture pattern may be added after an old architecture pattern is removed.

Similarly, the action_desn_i belonging to the design layer may include "add design pattern" and "remove design pattern". Further, "state effect_desn_i" refers to a design pattern set after adding/removing a system. In some embodiments, if the technical requirement is adjusted, a new design pattern may be added after an old design pattern is removed.

The action_code_i belonging to the code layer may include "add code pattern" and "remove code pattern". Further, "state effect_code_i" refers to a code pattern set after adding/removing a system. In some embodiments, if the technical requirement is adjusted, a new code pattern may be added after an old code pattern is removed.

In addition, in the embodiments of the disclosure, an effect generated by the "add code pattern" is, for example, adding a piece of program code to a program code of the specific application 173, and an effect generated by the "remove code pattern" is, for example, removing a piece of program code from the program code of the specific application 173. In an embodiment, neither the add/remove architecture pattern nor the add/remove design pattern may have any substantial impact on the program code of the specific application 173, and only the add/remove code pattern" may have the abovementioned substantial impact on the program code of the specific application 173.

In the embodiments of the disclosure, in addition to obtaining the domain file F1 associated with the specific application 173, the planner 131 may also obtain a problem file F2 associated with the specific application 173. The problem file F2 may indicate a first initial state and a target state of each of the planning layers of the specific application 173.

In response to the domain file F1 and the problem file F2, artificial intelligence planner 13 executed by the processor 104 may correspondingly execute an artificial intelligence planning method provided by the disclosure, and details thereof are described as follows.

Figure 2:
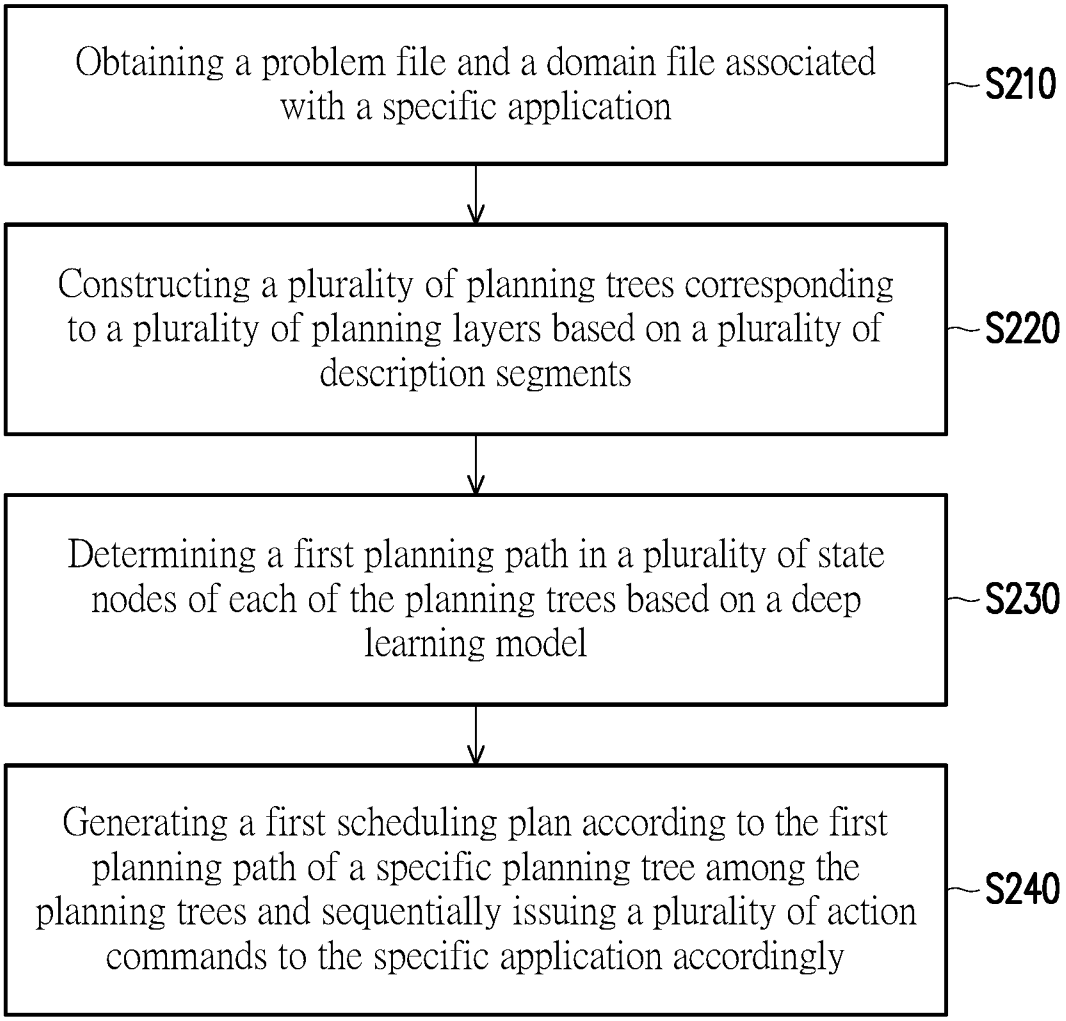
FIG. 2 is a schematic flow chart illustrating an artificial intelligence planning method according to an embodiment of the disclosure.

With reference to FIG. 2, which is a schematic flow chart illustrating an artificial intelligence planning method according to an embodiment of the disclosure. The method provided by this embodiment may be implemented by the artificial intelligence planner 13 of FIG. 1B executed by the processor 104 of FIG. 1A, and each step in FIG. 2 is described in detail together with the elements shown in FIG. 1B.

First, in step S210, the planner 131 in the artificial intelligence planner 13 obtains the problem file F2 and the domain file F1 associated with the specific application 173. Herein, the domain file F1 includes the N description segments (e.g., the [architecture], [design], and [code] mentioned in the foregoing paragraphs) of the N planning layers (i.e., the architecture layer, design layer, and code layer) corresponding to the specific application 173, and the problem file F2 may indicate the first initial state and the target state of each of the planning layers.

Next, in step S220, the planner 131 in the artificial intelligence planner 13 construct N planning trees corresponding to the planning layers based on the description segments.

In an embodiment, each of the planning trees has a plurality of state nodes and corresponds to one of the planning layers. That is, in the case that the specific application 173 has the architecture layer, design layer, and code layer, the planner 131 may construct 3 planning trees corresponding to the architecture layer (which may be understood as a $1^{st}$ planning layer), the design layer (which may be understood as a $2^{nd}$ planning layer), and the code layer (which may be understood as a $3^{rd}$ planning layer) based on the 3 description segments in the domain file F1, and each of the planning trees may include multiple state nodes.

Further, each of the planning layers has a planning node set, and the planning node set of each of the planning layers may include a plurality of planning nodes.

In an embodiment, the N description segments in the domain file F1 may include an $i^{th}$ description segment (i is an index value, and N>i≥1) corresponding to an $i^{th}$ planning layer among the N planning layers. Further, the $i^{th}$ description segment may include a plurality of first description sentences corresponding to the $i^{th}$ planning layer, and each of the first description sentences is expressed as "precond_i->action_i->effect_i". In an embodiment, precond_i is a pre-state, action_i is a specific action command, and effect_i is a result state which may be achieved by executing the specific action command in the pre-state.

In an embodiment, action_i includes adding a node to the planning nodes of the $i^{th}$ planning layer or removing a node from the planning nodes of the $i^{th}$ planning layer. Further, effect_i is the planning node set formed by the planning nodes of the $i^{th}$ planning layer after the specific action command is executed in the pre-state.

Further, the N description segments in the domain file F1 may include an $N^{th}$ description segment corresponding to an $N^{th}$ planning layer among the N planning layers, the $N^{th}$ description segment includes a plurality of description sentences corresponding to the $N^{th}$ planning layer, and each of the description sentences is expressed as: "precond_N->action_N->effect_N", where precond_N is a pre-state, action_N is a specific action command, and effect_N is a result state which may be achieved by executing the specific action command in the pre-state.

In an embodiment, action_N includes adding a node to the planning nodes of the $N^{th}$ planning layer or removing a node from the planning nodes of the $N^{th}$ planning layer, and effect_N is the planning node set formed by the planning nodes of the $N^{th}$ planning layer after the specific action command is executed in the pre-state.

Based on the above, when i is 1, the corresponding description segment may be understood as the content of [architecture] in the domain file F1. When i is 2, the corresponding description segment may be understood as the content of [design] in the domain file F1. When i is 3, the corresponding description segment may be understood as the content of [code] in the domain file F1.

In this case, the previously-mentioned action_arch_i may be understood as including adding a planning node to or removing a planning node from the planning node set corresponding to architecture layer. Correspondingly, effect_arch_i may be understood as the planning node set formed by the planning nodes corresponding to the architecture layer. Further, action_desn_i may be understood as including adding a planning node to or removing a planning node from the planning node set corresponding to design layer, and action_code_i may be understood as including adding a planning node to or removing a planning node from the planning node set corresponding to code layer. In this case, effect_desn_i may be understood as the planning node set formed by the planning nodes corresponding to the design layer, and effect_code__i may be understood as the planning node set formed by the planning nodes corresponding to the code layer.

Figure 3:
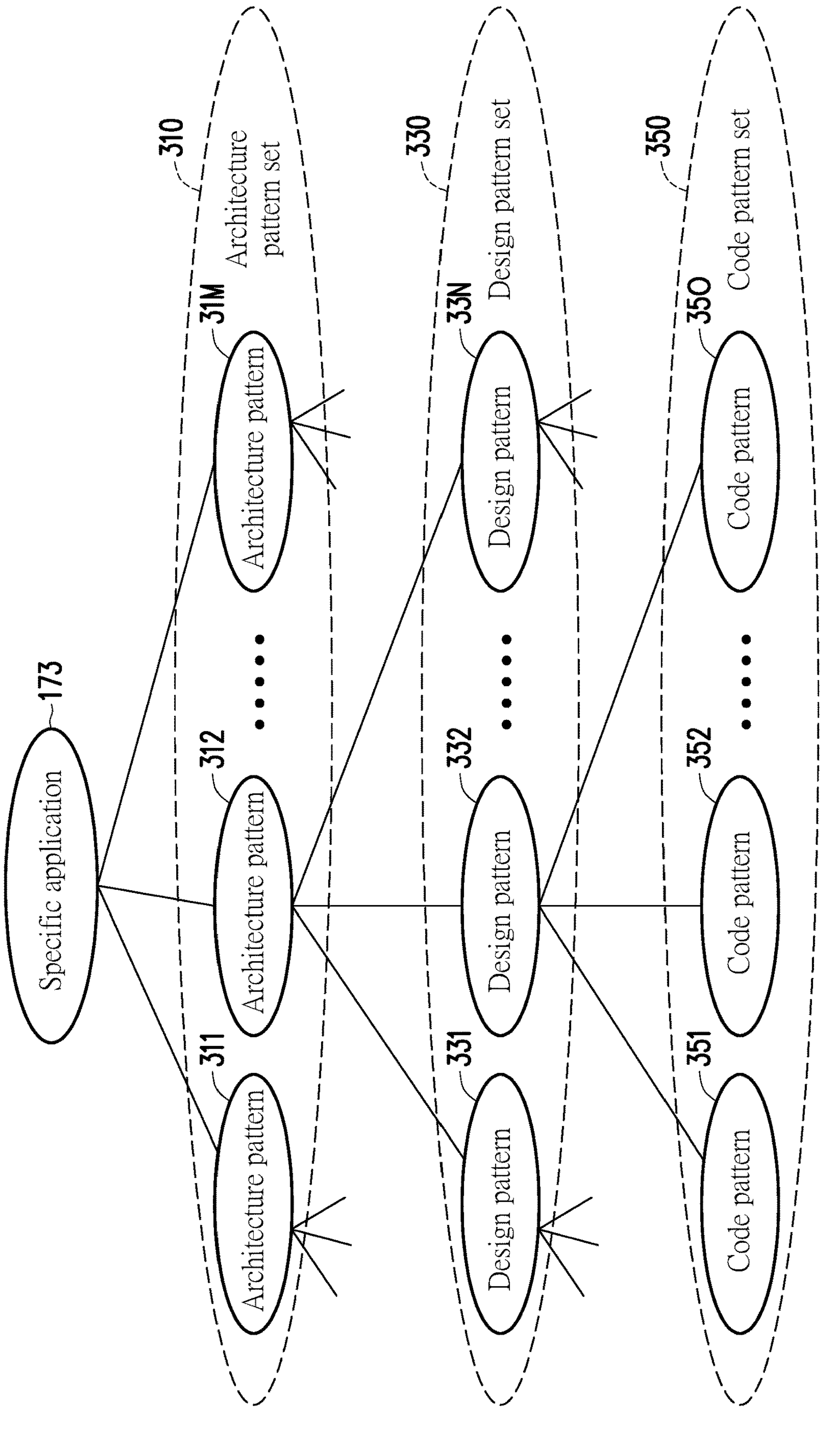
FIG. 3 is a schematic diagram illustrating planning node sets of a plurality of planning layers according to an embodiment of the disclosure.

With reference to FIG. 3, which is a schematic diagram illustrating planning node sets of a plurality of planning layers according to an embodiment of the disclosure. In FIG. 3, the planning node set corresponding to the architecture layer is, for example, an architecture pattern set 310, and the architecture pattern set 310 includes a plurality of architecture patterns 311 to 31M (i.e., the planning nodes in the planning node set corresponding to the architecture layer). The planning node set corresponding to the design layer is, for example, a design pattern set 330, and the design pattern set 330 includes a plurality of design patterns 331 to 33N (i.e., the planning nodes in the planning node set corresponding to the design layer). The planning node set corresponding to the code layer is, for example, a code pattern set 350, and the code pattern set 350 includes a plurality of code patterns 351 to 35O (i.e., the planning nodes in the planning node set corresponding to the code layer).

In FIG. 3, one of the planning nodes (hereinafter referred to as a first planning node) of the $i^{th}$ planning layer may correspond to multiple planning nodes (hereinafter referred to as second planning nodes) of an $i+1^{th}$ planning layer. For instance, the architecture pattern 312 of the $1^{st}$ planning layer (i.e., the architecture layer) may correspond to the design patterns 331 to 33N of the $2^{nd}$ planning layer (i.e., the design layer). The design pattern 332 of the $2^{nd}$ planning layer (i.e., the design layer) may correspond to the code patterns 351 to 35O of the $3^{rd}$ planning layer (i.e., the code layer).

In an embodiment, the first planning node may satisfy a plurality of first preset conditions corresponding to the $i^{th}$ planning layer. Further, all of the second planning nodes corresponding to the first planning node may satisfy a plurality of second preset conditions corresponding to the $i+1^{th}$ layer, where i is a positive integer and $N>i\geq 1$.

In an embodiment, the first preset conditions met by the first planning node may include that the planning node set of the $i^{th}$ planning layer is not empty and may include meeting a requirement of the $i^{th}$ planning layer. In an embodiment, the requirement of the $i^{th}$ planning layer is determined based on a control flow graph, a data flow graph, a call graph, and a constraint condition graph, and content of the graphs may be determined by the designer according to needs.

Besides, the first preset conditions met by the first planning node further include achieving a metric of the $i^{th}$ planning layer. In an embodiment, the planner 131 may obtain input data of the specific application 173 and estimates a fitness score corresponding to the $i^{th}$ planning layer according to the input data. In an embodiment, the planner 131 may determine that the first planning node achieves the metric of the $i^{th}$ planning layer in response to determining that the fitness score corresponding to the $i^{th}$ planning layer is greater than a score threshold of the $i^{th}$ planning layer; otherwise, the planner 131 may determine that the first planning node does not achieve the metric of the $i^{th}$ planning layer.

Figure 4:
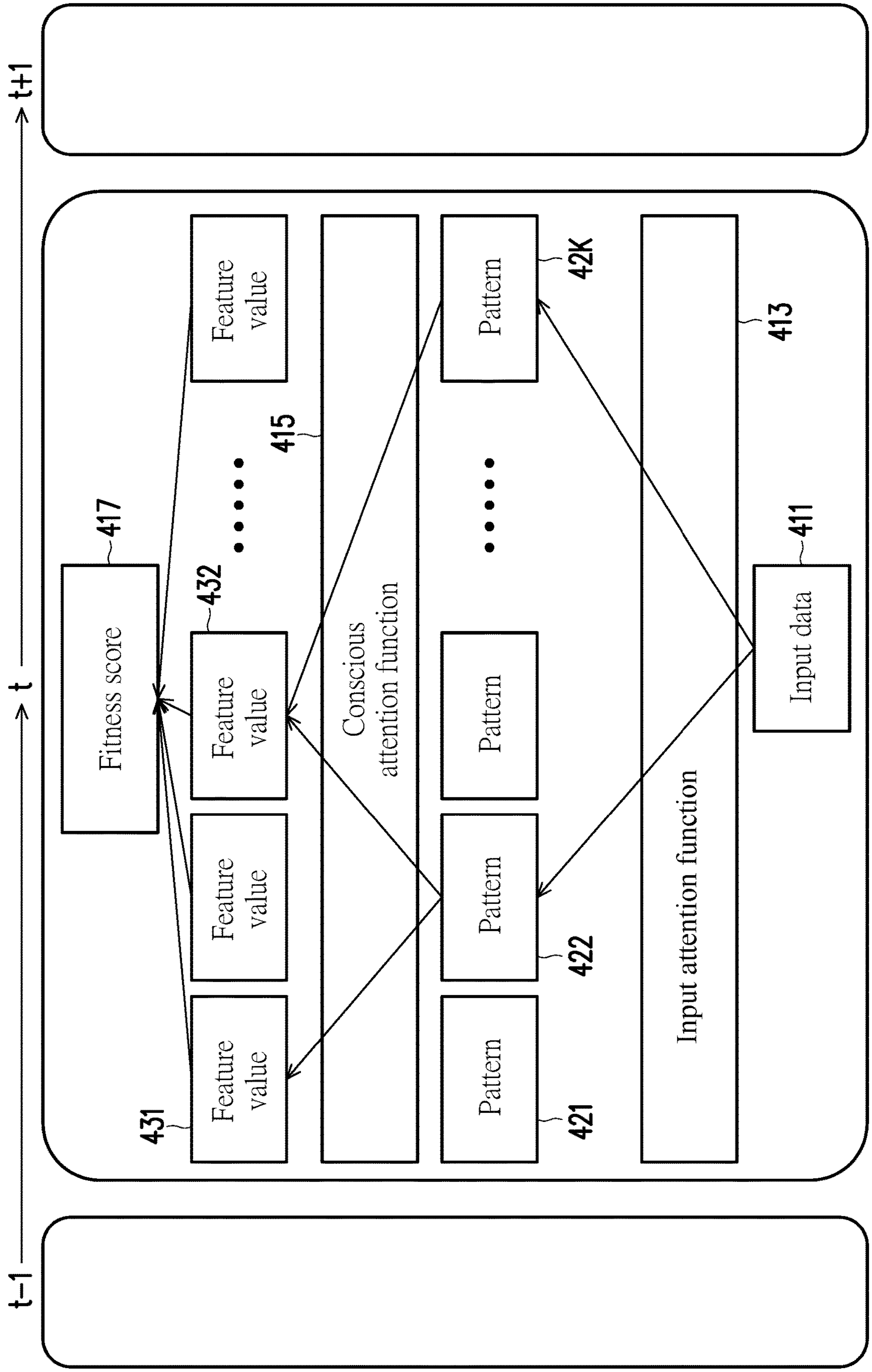
FIG. 4 is a schematic diagram illustrating estimation of a fitness score corresponding to an $i^{th}$ planning layer according to an embodiment of the disclosure.

With reference to FIG. 4, which is a schematic diagram illustrating estimation of a fitness score corresponding to the $i^{th}$ planning layer according to an embodiment of the disclosure. At a time point t in FIG. 4, the planner 131 may obtain input data 411 corresponding to the specific application 173. In different embodiments, a form of the input data 411 may vary according to a type of the specific application 173. For instance, it is assumed that the specific application 173 is a virtual reality application, and the input data 411 is, for example, related image data. Further, if the specific application 173 is a music player program, the input data 411 is, for example, a related audio file, but it is not limited thereto.

Next, the planner 131 may execute an input attention function 413 to find a plurality of reference patterns among a plurality of patterns 421 to 42K corresponding to the $i^{th}$ planning layer in response to the input data 411. In an embodiment, it is assumed that the considered $i^{th}$ planning layer is an architecture layer, each of the patterns 421 to 42K is then, for example, an architecture pattern. If the considered $i^{th}$ planning layer is a design layer, each of the patterns 421 to 42K is, for example, a design pattern. If the considered $i^{th}$ planning layer is a code layer, each of the patterns 421 to 42K is, for example, a code pattern, but it is not limited thereto.

In FIG. 4, it is assumed that the found reference patterns are the patterns 422 and 42K, the planner 131 may execute a conscious attention function 415 to find a plurality of feature values (e.g., feature values 431 and 432) corresponding to the reference patterns (i.e., reference patterns 422 and 42K). Next, the planner 131 may determine a fitness score 417 corresponding to the $i^{th}$ planning layer based on the feature values 431 and 432, but it is not limited thereto.

In some embodiments, related details of FIG. 4 may be found with reference to "Goyal, A., Lamb, A., Hoffmann, J., Sodhani, S., Levine, S., Bengio, Y., & Schölkopf, B. (2021). Recurrent Independent Mechanisms. ArXiv, abs/1909.10893.", and description thereof is not repeated herein.

In an embodiment, the first planning node may be understood as one of the first description sentences corresponding to the $i^{th}$ description segment. In an embodiment, before executing action_i (adding/removing the first planning node, for example) corresponding to the first planning node, the planner 131 may determine whether all of the corresponding second planning nodes satisfy the second preset conditions corresponding to the i+1th planning layer. In some embodiments, the second preset conditions may include that the planning node set corresponding to the $i+1^{th}$ planning layer is not empty and may include meeting a requirement of the $i+1^{th}$ planning layer and achieving a metric of the $i+1^{th}$ planning layer. Details thereof may be found with reference to the description related to the requirement/metric of the $i^{th}$ planning layer provided in the foregoing embodiments, and description thereof is thus not repeated herein.

In an embodiment, in response to determining that all of the second planning nodes corresponding to the first planning node satisfy the second preset conditions corresponding to the $i+1^{th}$ layer, the planner 131 may execute action_i corresponding to the first planning node; otherwise, the planner 131 does not execute action_i corresponding to the first planning node. In other words, the planner 131 executes action_i corresponding to the first planning node only when it is determined that all of the second planning nodes corresponding to the first planning node satisfy the second preset conditions in the $i+1^{th}$ planning layer.

Taking FIG. 3 as an example, when the planner 131 determines whether to execute action_i corresponding to the architecture pattern 312, the planner 131 first determines whether all of the design patterns 331 to 33N corresponding to the architecture pattern 312 satisfy the corresponding preset conditions (e.g., whether satisfying the requirement of the design layer and whether achieving the metric of the design layer). Further, when the planner 131 determines whether to execute action_i corresponding to the design pattern 332, the planner 131 first determines whether all of the code patterns 351 to 35O corresponding to the design pattern 332 satisfy the corresponding preset conditions (e.g., whether satisfying the requirement of the code layer and whether achieving the metric of the code layer).

In other words, when the planner 131 determines that action_i corresponding to the architecture pattern 312 is executed, it means that all of the patterns (including but not limited to the design patterns 331 to 33N and the code patterns 351 to 35O) of other planning layers corresponding to the architecture pattern 312 meet the corresponding preset conditions.

In short, based on the content of the domain file F1, the planner 131 may generate the planning tree corresponding to each planning layer based on the above teaching.

Figure 5:
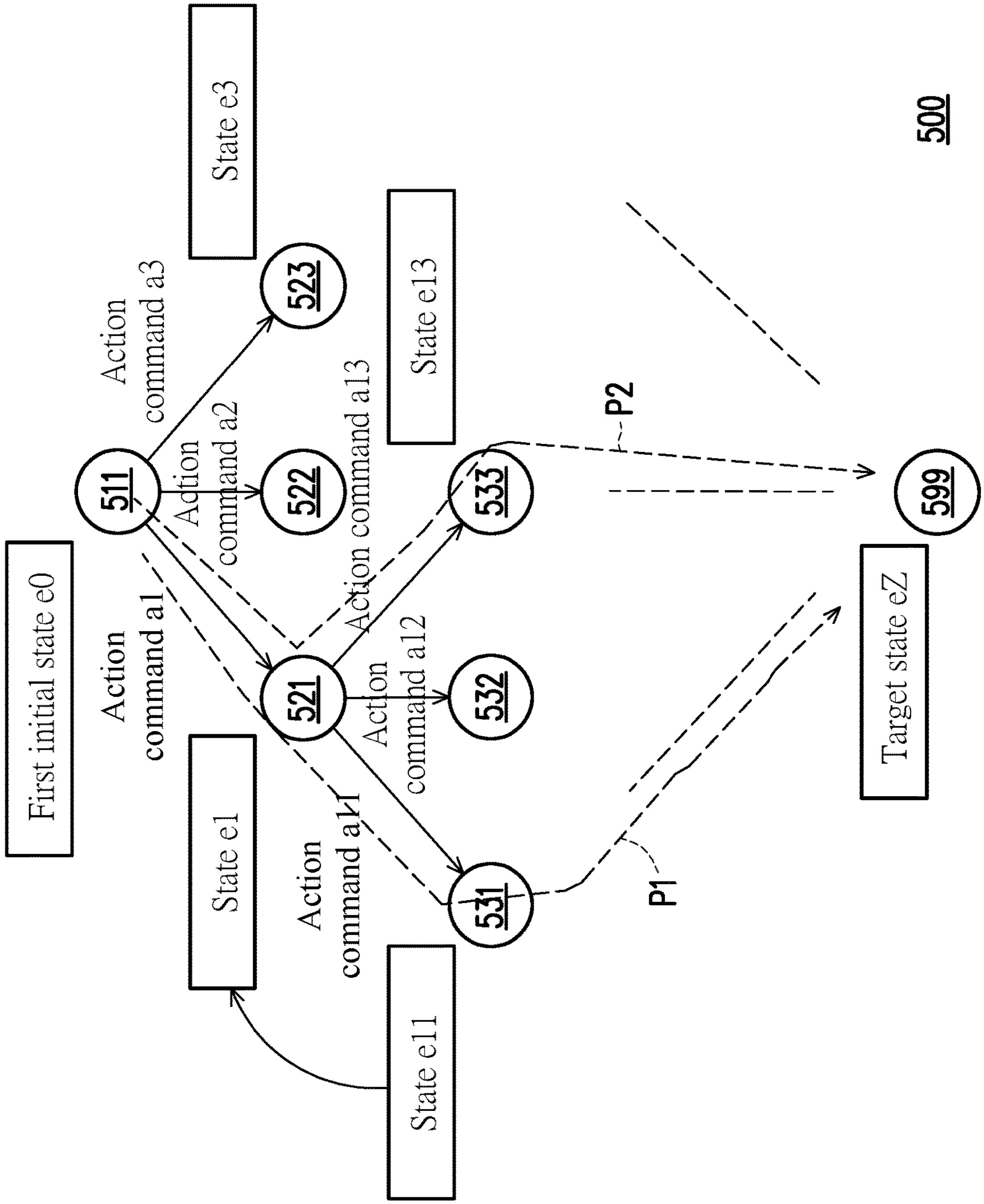
FIG. 5 is a schematic diagram illustrating a planning tree corresponding to a code layer according to an embodiment of the disclosure.

With reference to FIG. 5, which is a schematic diagram illustrating the planning tree corresponding to the code layer according to an embodiment of the disclosure. It should be understood that the planning trees corresponding to the architecture layer and the design layer also have a form similar to that provided in FIG. 5. However, in the embodiments of the disclosure, since only the operations in the code layer may have a substantial impact (for example, adding/deleting a piece of program code) on the program code of the specific application 173, a planning tree 500 corresponding to the code layer in FIG. 5 is taken as an example herein for illustration.

In FIG. 5, the planning tree 500 includes a plurality of state nodes 511 to 599. A state node 511 corresponds to, for example, a first initial state e0 of the code layer indicated by the problem file F2, and the state node 599 corresponds to, for example, a target state eZ of the code layer indicated by the problem file F2.

From FIG. 5, it can be seen that in the planning tree 500 established by the planner 131 according to the domain file F1, if an action command a1 is issued in the first initial state e0 corresponding to the state node 511, a state e1 corresponding to the state node 521 may be accordingly entered. If an action command a3 is issued in the first initial state e0 corresponding to the state node 511, a state e3 corresponding to the state node 523 may be accordingly entered. Further, if an action command a11 is issued in the state e1 corresponding to the state node 521, a state e11 corresponding to the state node 531 may be accordingly entered. If an action command a13 is issued in the state e1 corresponding to the state node 521, a state e13 corresponding to the state node 533 may be accordingly entered.

In an embodiment, after generating the planning tree for each of the planning layers, the planner 131 may execute step S230 to determine a first planning path in the state nodes of each of the planning trees based on a deep learning model.

Taking FIG. 5 as an example, after generating the planning tree 500, the planner 131 may determine the first planning path in the state nodes 511 to 599 of the planning tree 500 based on the deep learning model.

In an embodiment, regarding a specific state node (hereinafter referred to as a first state node) on the planning tree 500, the deep learning model selects one or a plurality of reference state nodes following the first state node among the state nodes 511 to 599 of the planning tree 500 based on an operation observation associated with the specific application 173 and a state of the first state node.

In FIG. 5, when the considered first state node is the state node 511, the deep learning model may select one or more reference state nodes following the first state node 511 among the state nodes 521 to 599 of the planning tree 500 based on the operation observation associated with the specific application 173 and the state e1 of the state node 511. In an embodiment, it is assumed that the deep learning model determines that the state nodes 521 and 522 are suitable to follow the state node 511 based on the operation observation of the specific application 173 and the state e1 of the state node 511, the deep learning model may then select the state nodes 521 and 522 as the reference state nodes following the state node 511, but it is not limited thereto.

In some embodiments, in order to enable the deep learning model to be equipped with the abovementioned capabilities, the deep learning model may be trained through a corresponding training process. In some embodiments, the training data used to train the learning model may be expressed as "what action command should be taken under a combination of a specific state and operation observation". In an embodiment, this training data may be presented as "(observation, state)->action", but it is not limited thereto.

In this way, the deep learning model may learn which action command should be taken when a specific combination of state and operation observation is encountered. For instance, in the context of selecting the state nodes 521 and 522 as the reference state nodes following the state node 511, the deep learning model may be understood as determining that it is suitable to take the action command a1 or a2 under the combination of the current state (i.e., the first initial state e0) and operation observation, but it is not limited thereto.

Regarding each state node on the planning tree 500, the deep learning model may perform the operations taught above to select one or more reference state nodes corresponding to each state node. In this case, the planner 131 may connect each state node of the planning tree 500 to the corresponding one or more reference state nodes to form at least one candidate path in the planning tree 500. Herein, each candidate path may guide the $i^{th}$ planning layer from the corresponding first initial state e0 to the corresponding target state eZ. Next, the planner 131 may treat one of the at least one candidate path of the planning tree 500 as the first planning path of the planning tree 500.

In FIG. 5, assuming that the planner 131 finds a total of candidate paths P1 and P2, and the candidate paths P1 and P2 may both guide the $i^{th}$ planning layer from the corresponding first initial state e0 to the corresponding target state eZ. In this case, the planner 131 may select one of the candidate paths P1 and P2 as the first planning path of the planning tree 500.

In an embodiment, the planner 131 may select, for example, the one with a smaller number of hops (that is, the one containing fewer state nodes) from the candidate paths P1 and P2 as the first planning path of the planning tree 500. In other embodiments, the planner 131 may also set weights for the state nodes in the candidate paths P1 and P2 according to specific principles required by the designer, and then calculates a sum of the weights of the state nodes in the candidate paths P1 and P2. After that, the planner 131 may select the one with a larger (or smaller) sum of the weights from the candidate paths P1 and P2 as the first planning path of the planning tree 500, but it is not limited thereto.

In other embodiments, based on the teachings provided above, the planner 131 may find the corresponding first planning paths for the planning trees corresponding to the architecture layer and the design layer, so description of the details is not repeated herein.

In the embodiments of the disclosure, the planner 131 may also determine whether any of the action commands in the planning tree 500 is not successfully executed. In an embodiment, in response to determining that a first action command among the action commands in the planning tree 500 is not successfully executed, the planner 131 may return to a previous state and executes this first action command again until the first action command is successfully executed.

Taking FIG. 5 as an example, assuming that the planner 131 determines that the action command a11 cannot be successfully executed due to specific reasons (for example, the corresponding function/module of the specific application 173 cannot be accessed temporarily), so that the state e13 cannot be successfully entered. In this case, the planner 131 may return to the state e1 and try to issue the action command a11 again. If the action command a11 is still not successfully executed, the planner 131 may repeatedly execute the above actions until the action command a11 is successfully executed, but it is not limited thereto.

In step S240, the planner 131 generates a first scheduling plan Z03 according to a first planning path Z01 of a specific planning tree among the planning trees and sequentially issues a plurality of action commands A1 to AZ to the specific application 173 accordingly.

In the embodiments of the disclosure, since only the action commands corresponding to the code layer may have a substantial impact (for example, adding/deleting a piece of program code) on the program code of the specific application 173, the planner 131 may adopt the planning tree (e.g., planning tree 500 in FIG. 5) corresponding to the code layer to act as the considered specific planning tree, but it is not limited thereto.

In an embodiment, the first planning path Z01 of the specific planning tree is, for example, an unscheduled plan including the action commands A1 to AZ, that is, the action commands A1 to AZ have not yet been set with corresponding execution modes/execution time points. Taking FIG. 5 as an example, it is assumed that the candidate path P1 is selected as the first planning path Z01 of the planning tree 500, the action commands a1 and a11 included in the candidate path P1 (as well as other action commands included in the candidate path P1 that are not shown) may form the unscheduled plan of the planning tree 500, but it is not limited thereto.

After that, a scheduler 133 may assign a corresponding execution time point and an execution mode to each of the action commands A1 to AZ in the unscheduled plan (e.g., a first scheduling plan Z01) to generate the first scheduling plan Z03.

Next, the controller 15 may then sequentially issue the action commands A1 to AZ to the specific application 173 according to the execution time point of each of the action commands A1 to AZ in the first scheduling plan Z03. After that, the controller 15 may obtain an operation observation O1 generated by the specific application 173 in response to the first action command among the action commands A1 to AZ. For ease of description, the following assumes that the action command A1 is the considered first action command, but it is not limited thereto.

In an embodiment, after receiving the action commands A1 to AZ, the target system 171 may sequentially convert the action commands A1 to AZ into control commands C1 to CZ and may control the specific application 173 through the control commands C1 to CZ (such as adding/deleting a program code). In an embodiment, the specific application 173 may generate a corresponding operation event E1 in response to the control command C1 corresponding to the action command A1, which may be presented as a log or other types of files, for example. After that, the target system 171 may convert the operation event E1 into the operation observation O1 and provides the operation observation O1 to the controller 15.

In some embodiments, the operation of the specific application 173 may generate new technical requirements over time, which may make the first scheduling plan Z03 gradually inapplicable. Therefore, a replanning mechanism is provided in the disclosure to adaptively generate a new scheduling plan based on the operation of the specific application 173 in a timely manner.

In an embodiment, the controller 15 may convert the operation observation O1 of the specific application 173 into an execution state ES1, and the artificial intelligence planner 13 may determine whether the execution state ES1 indicates that a new scheduling plan needs is required to be generated. In an embodiment, the artificial intelligence planner 13 may make the above determination according to an application type of the specific application 173.

For instance, assuming that the target server 17 is an MEC server operating under the control of a core network of the fifth-generation communication system, the artificial intelligence planner 13 may then obtain the required big data (e.g., operation observation O1, execution state ES1, etc.) through a network data analytics function (NWDAF) of this core network, and then determines whether the relevant technical requirements have changed (e.g., the need for larger bandwidth/lower delay, etc.).

In an embodiment, in response to determining that the relevant technical requirements have changed, the artificial intelligence planner 13 may then determine that a new scheduling plan needs to be generated; otherwise, the artificial intelligence planner 13 may determine that a new scheduling plan does not need to be generated, but it is not limited thereto.

In an embodiment, in response to determining that a new scheduling plan needs to be generated, the planner 131 determines a second initial state based on the execution state ES1 of the specific application 173 and determines a second planning path in the state nodes of each of the planning trees based on the deep learning model. Herein, the second planning path of each of the planning trees may guide the corresponding planning layer from the corresponding second initial state to the corresponding target state. Details thereof may be found with reference to the description of the determination of the first planning path for each planning tree made by the planner 131, and description thereof thus is not repeated herein.

After that, the scheduler 133 may generate a second scheduling plan according to the second planning path of the specific planning tree (e.g., planning tree 500) among the planning trees and sequentially issues a plurality of other action commands to the specific application 173 accordingly. Details thereof may be found with reference to the description of the determination of the first scheduling plan Z03 for the planning tree 500 made by the scheduler 133 according to the first planning path Z01 of the planning tree 500, and description thereof thus is not repeated herein.

It should be understood that although the above description of the replanning mechanism is directed to the specific application 173 having multiple planning layers (that is, N is greater than 1), in other embodiments, the replanning mechanism is also applicable to the specific application 173 having only a single planning layer (that is, N is 1).

Figure 6:
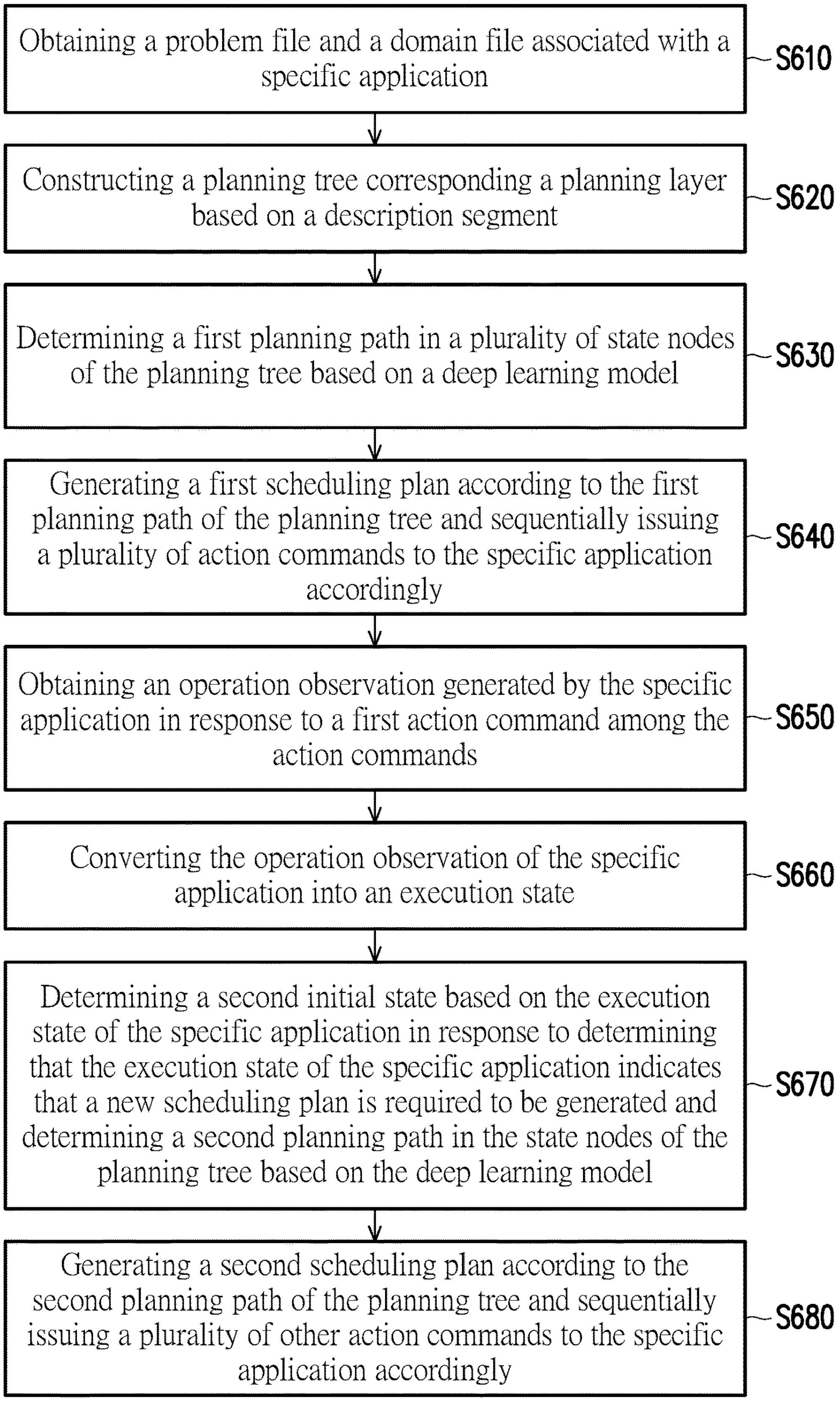
FIG. 6 is a schematic flow chart illustrating an artificial intelligence planning method according to an embodiment of the disclosure.

With reference to FIG. 6, which is a schematic flow chart illustrating an artificial intelligence planning method according to an embodiment of the disclosure. The method provided by this embodiment may be implemented by the artificial intelligence planner 13 of FIG. 1B executed by the processor 104 of FIG. 1A, and each step in FIG. 6 is described in detail together with the elements shown in FIG. 1B. In this embodiment, the steps shown herein may be applied to the specific application 173 having only a single planning layer (that is, N is 1), but it is not limited thereto.

First, in step S610, the planner 131 obtains the problem file F2 and the domain file F1 associated with the specific application 173. Herein, the domain file F1 includes a single description segment D1 of a single planning layer L1 corresponding to the specific application 173, and the problem file F2 indicates the first initial state and the target state of each of the single planning layer L1.

In step S620, the planner 131 constructs a planning tree T1 corresponding to the planning layer L1 based on the description segment D1, and the planning tree T1 has a plurality of state nodes.

In step S630, the planner 131 determines a first planning path PP1 in the state nodes of the planning tree T1 based on a deep learning model. Herein, the first planning path PP1 of the planning tree T1 guides the planning layer L1 from the corresponding first initial state to the corresponding target state.

In step S640, the scheduler 133 generates a first scheduling plan PL1 according to the first planning path PP1 of the planning tree T1, and the controller 15 sequentially issues a plurality of action commands AA1 to AAZ to the specific application 173 accordingly.

In step S650, the controller 15 obtains an operation observation O1a generated by the specific application 173 in response to a first action command among the action commands AA1 to AAZ.

In step S660, the controller 15 converts the operation observation O1a of the specific application 173 into an execution state ES1a.

In step S670, in response to determining that the execution state ES1a of the specific application 173 indicates that a new scheduling plan is required to be generated, the planner 131 determines a second initial state based on the execution state ES1a of the specific application 173 and determines a second planning path PP2 in the state nodes of the planning tree T1 based on the deep learning model. Herein, the second planning path PP2 of a planning tree T2 guides the planning layer L1 from the corresponding second initial state to the corresponding target state.

In step S680, the scheduler 133 generates a second scheduling plan PL2 according to the second planning path PP2 of the planning tree T2 and sequentially issues a plurality of other action commands to the specific application 173 accordingly. Details of the steps in FIG. 6 may be found with reference to the description provided in the foregoing embodiments, and description thereof is thus not repeated herein.

In view of the foregoing, in the embodiments of the disclosure, in the case that the considered specific application has a plurality of planning layers (e.g., the architecture layer, design layer, code layer, etc.), the corresponding planning node set and the planning tree are established for each of the planning layers according to the domain file, and all of the planning nodes in the planning node set of each of the planning layers satisfy the corresponding preset conditions. In addition, in the embodiments of the disclosure, the corresponding planning path may be determined in each of the planning trees, and a plurality of action commands may thus be accordingly issued to the specific application to achieve the corresponding target state. In this way, the specific application having multiple planning layers may be equipped with self-configuration, self-optimizing, and self-healing functions and is then implemented as a self-organizing application.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An artificial intelligence planning method, executed by an artificial intelligence planning device comprising a processor, comprising:

obtaining, by an artificial intelligence planner executed by the processor, a problem file and a domain file associated with a specific application run on a target server, wherein the domain file comprises N description segments corresponding to N planning layers of the specific application, N is a positive integer greater than 1, and the problem file indicates a first initial state and a target state of each of the planning layers;

constructing, by the artificial intelligence planner executed by the processor, N planning trees corresponding to the planning layers based on the description segments, wherein each of the planning trees has a plurality of state nodes and corresponds to one of the planning layers, wherein each of the planning layers has a planning node set, the planning node set of each of the planning layers comprises a plurality of planning nodes, the planning nodes of an $i^{th}$ planning layer among the planning layers comprise a first planning node, the planning nodes of an $i+1^{th}$ planning layer among the planning layers comprise a plurality of second planning nodes corresponding to the first planning node, the first planning node satisfies a plurality of first preset conditions corresponding to the $i^{th}$ planning layer, and all of the planning nodes of a second planning tree satisfy a plurality of second preset conditions of the $i+1^{th}$ layer, wherein i is a positive integer and $N>i\geq1$;

determining, by the artificial intelligence planner executed by the processor, a first planning path in the state nodes of each of the planning trees based on a deep learning model, wherein the first planning path of each of the planning trees guides the corresponding planning layer from the corresponding first initial state to the corresponding target state; and generating, by the artificial intelligence planner executed by the processor, a first scheduling plan according to the first planning path of a specific planning tree among the planning trees, wherein the first scheduling plan comprises a plurality of action commands assigned with corresponding execution time point;

sequentially issuing, by the artificial intelligence planner executed by the processor, the plurality of action commands to the specific application run on the target server according to the first scheduling plan, wherein the plurality of the action commands controls the target server to add a piece of program code to a program code of the specific application or remove a piece of program code from the program code of the specific application at the corresponding execution time point;

wherein the description segments comprise an $N^{th}$ description segment corresponding to an $N^{th}$ planning layer among the planning layers, the $N^{th}$ description segment comprises a plurality of description sentences corresponding to the $N^{th}$ planning layer, and each of the description sentences is expressed as follows:

precond_N->action N->effect_N wherein precond_N is a pre-state, action_N is a specific action command, and effect_N is a result state which is achievable by executing the specific action command in the pre-state, wherein action_N comprises adding a node to the planning nodes of the $N^{th}$ planning layer or removing a node from the planning nodes of the $N^{th}$ planning layer, and effect_N is the planning node set formed by the planning nodes of the $N^{th}$ planning layer after the specific action command is executed in the pre-state, the $N^{th}$ planning layer corresponds to a code layer of the specific application, and action_N comprises adding the piece of program code to the program code of the specific application or removing the piece of program code from the program code of the specific application, wherein the description segments comprise an $i^{th}$ description segment corresponding to the $i^{th}$ planning layer, the $i^{th}$ description segment comprises a plurality of first description sentences corresponding to the $i^{th}$ planning layer, and each of the first description sentences is expressed as follows:

precond_i->action_i->effect_i, wherein precond_i is a pre-state, action_i is a specific action command, and effect_i is a result state which may be achieved by executing the specific action command in the pre-state;

wherein the first planning node corresponds to one of the first description sentences, and the method further comprises:

determining whether all of the second planning nodes satisfy the second preset conditions corresponding to the i+1$^{th}$ layer before executing action_i corresponding to the first planning node; and executing action_i corresponding to the first planning node in response to determining that all of the second planning nodes satisfy the second preset conditions corresponding to the i+1$^{th}$ layer, otherwise, not executing action_i corresponding to the first planning node;

wherein the first preset conditions met by the first planning node comprise achieving a metric of the i$^{th}$ planning layer, and the method further comprises the following steps:

obtaining input data of the specific application, determining a plurality of reference patterns among a plurality of patterns corresponding to the i$^{th}$ planning layer in response to the input data by executing an input attention function, determining a plurality of feature values corresponding to the plurality of reference patterns by executing conscious attention function and estimating a fitness score corresponding to the i$^{th}$ planning layer according to the plurality of feature values; and determining that the first planning node achieves the metric of the i$^{th}$ planning layer in response to determining that the fitness score corresponding to the i$^{th}$ planning layer is greater than a score threshold of the i$^{th}$ planning layer, wherein the step of estimating the fitness score corresponding to the i$^{th}$ planning layer according to the input data further comprises:

executing an input attention function to find a plurality of reference patterns among a plurality of patterns corresponding to the i$^{th}$ planning layer in response to the input data;

executing a conscious attention function to find a plurality of feature values corresponding to the reference patterns; and determining the fitness score corresponding to the i$^{th}$ planning layer based on the feature values.

2. The method according to claim 1, wherein the first preset conditions met by the first planning node comprise that the planning node set of the i$^{th}$ planning layer is not empty and comprise meeting a requirement of the i$^{th}$ planning layer and achieving a metric of the i$^{th}$ planning layer.

3. The method according to claim 2, wherein the requirement of the i$^{th}$ planning layer is determined based on a control flow graph, a data flow graph, a call graph, and a constraint condition graph.

4. The method according to claim 1, wherein the planning trees comprise a first planning tree corresponding to an i$^{th}$ planning tree, and the step of determining the first planning path in the state nodes of each of the planning trees based on the deep learning model further comprises:

selecting, by the deep learning model, at least one reference state node following a first state node among the state nodes of the first planning tree based on an operation observation associated with the specific application and a state of the first state node regarding the first state node of the first planning tree;

obtaining the at least one reference state node corresponding to each of the state nodes of the first planning tree and connecting each of the state nodes of the first planning tree and the corresponding at least one reference state node to form at least one candidate path in the first planning tree, wherein the at least one candidate path guides the i$^{th}$ planning layer from the corresponding first initial state to the corresponding target state; and treating one of the at least one candidate path of the first planning tree as the first planning path of the first planning tree.

5. The method according to claim 1, wherein action_i comprises adding a node to the planning nodes of the i$^{th}$ planning layer or removing a node from the planning nodes of the i$^{th}$ planning layer, and effect_i is the planning node set formed by the planning nodes of the i$^{th}$ planning layer after the specific action command is executed in the pre-state.

6. The method according to claim 1, wherein the specific planning tree corresponds to an N$^{th}$ planning layer among the planning layers, the N$^{th}$ planning layer corresponds to a code layer of the specific application, and each of the action commands comprises adding a piece of program code to the specific application or removing a piece of program code from the specific application.

7. The method according to claim 1, further comprising:

in response to determining that a first action command among the action commands is not successfully executed, returning to a previous state and executing the first action command again.

8. The method according to claim 1, wherein the first planning path of the specific planning tree is an unscheduled plan comprising the action commands, and the step of generating the first scheduling plan according to the first planning path of the specific planning tree among the planning trees further comprises:

assigning, by a scheduler, a corresponding execution time point and an execution mode to each of the action commands in the unscheduled plan to generate the first scheduling plan, wherein the step of sequentially issuing the action commands to the specific application further comprises:

sequentially issuing the action commands to the specific application according to the execution time point of each of the action commands.

9. The method according to claim 1, further comprising:

obtaining an operation observation generated by the specific application in response to a first action command among the action commands;

converting the operation observation of the specific application into an execution state;

determining a second initial state based on the execution state of the specific application in response to determining that the execution state of the specific application indicates that a new scheduling plan is required to be generated and determining a second planning path in the state nodes of each of the planning trees based on the deep learning model, wherein the second planning path of each of the planning trees guides the corresponding planning layer from the corresponding second initial state to the corresponding target state; and generating a second scheduling plan according to the second planning path of the specific planning tree among the planning trees and sequentially issuing a plurality of other action commands to the specific application accordingly.

10. An artificial intelligence planning device, comprising:

a storage circuit, storing a program code;

a processor, coupled to the storage circuit, accessing the program code for:

obtaining a problem file and a domain file associated with a specific application run on a target server, wherein the domain file comprises N description segments corresponding to N planning layers of the specific application, N is a positive integer greater than 1, and the problem file indicates a first initial state and a target state of each of the planning layers;

constructing N planning trees corresponding to the planning layers based on the description segments, wherein each of the planning trees has a plurality of state nodes and corresponds to one of the planning layers, wherein each of the planning layers has a planning node set, the planning node set of each of the planning layers comprises a plurality of planning nodes, the planning nodes of an $i^{th}$ planning layer among the planning layers comprise a first planning node, the planning nodes of an $i+1^{th}$ planning layer among the planning layers comprise a plurality of second planning nodes corresponding to the first planning node, the first planning node satisfies a plurality of first preset conditions corresponding to the $i^{th}$ planning layer, and all of the planning nodes of a second planning tree satisfy a plurality of second preset conditions of the $i+1^{th}$ layer, wherein i is a positive integer and $N>i\geq 1$;

determining a first planning path in the state nodes of each of the planning trees based on a deep learning model, wherein the first planning path of each of the planning trees guides the corresponding planning layer from the corresponding first initial state to the corresponding target state; and generating a first scheduling plan according to the first planning path of a specific planning tree among the planning trees, wherein the first scheduling plan comprises a plurality of action commands assigned with corresponding execution time point;

sequentially issuing the plurality of action commands to the specific application run on the target server according to the first scheduling plan, wherein the plurality of the action commands controls the target server to add a piece of program code to a program code of the specific application or remove a piece of program code from the program code of the specific application at the corresponding execution time point;

wherein the description segments comprise an $N^{th}$ description segment corresponding to an $N^{th}$ planning layer among the planning layers, the $N^{th}$ description segment comprises a plurality of description sentences corresponding to the $N^{th}$ planning layer, and each of the description sentences is expressed as follows:

precond_N->action_N->effect_N wherein precond_N is a pre-state, action_N is a specific action command, and effect_N is a result state which is achievable by executing the specific action command in the pre-state, wherein action_N comprises adding a node to the planning nodes of the $N^{th}$ planning layer or removing a node from the planning nodes of the $N^{th}$ planning layer, and effect_N is the planning node set formed by the planning nodes of the $N^{th}$ planning layer after the specific action command is executed in the pre-state, the $N^{th}$ planning layer corresponds to a code layer of the specific application, and action_N comprises adding the piece of program code to the program code of the specific application or removing the piece of program code from the program code of the specific application, wherein the description segments comprise an $i^{th}$ description segment corresponding to the $i^{th}$ planning layer, the $i^{th}$ description segment comprises a plurality of first description sentences corresponding to the $i^{th}$ planning layer, and each of the first description sentences is expressed as follows:

precond_i->action_i->effect_i, wherein precond_i is a pre-state, action_i is a specific action command, and effect_i is a result state which may be achieved by executing the specific action command in the pre-state;

wherein the first planning node corresponds to one of the first description sentences, and the processor is configured to further perform:

determining whether all of the second planning nodes satisfy the second preset conditions corresponding to the $i+1^{th}$ layer before executing action_i corresponding to the first planning node; and executing action_i corresponding to the first planning node in response to determining that all of the second planning nodes satisfy the second preset conditions corresponding to the $i+1^{th}$ layer, otherwise, not executing action_i corresponding to the first planning node;

wherein the first preset conditions met by the first planning node comprise achieving a metric of the $i^{th}$ planning layer, and the method further comprises the following steps:

obtaining input data of the specific application, determining a plurality of reference patterns among a plurality of patterns corresponding to the $i^{th}$ planning layer in response to the input data by executing an input attention function, determining a plurality of feature values corresponding to the plurality of reference patterns by executing conscious attention function and estimating a fitness score corresponding to the $i^{th}$ planning layer according to the plurality of feature values; and determining that the first planning node achieves the metric of the $i^{th}$ planning layer in response to determining that the fitness score corresponding to the $i^{th}$ planning layer is greater than a score threshold of the $i^{th}$ planning layer, wherein the step of estimating the fitness score corresponding to the $i^{th}$ planning layer according to the input data further comprises:

executing an input attention function to find a plurality of reference patterns among a plurality of patterns corresponding to the $i^{th}$ planning layer in response to the input data;

executing a conscious attention function to find a plurality of feature values corresponding to the reference patterns; and determining the fitness score corresponding to the $i^{th}$ planning layer based on the feature values.

11. An artificial intelligence planning method, comprising:

obtaining a problem file and a domain file associated with a specific application run on a target server, wherein the domain file comprises N description segments corresponding to N planning layers of the specific application, N is a positive integer greater than or equal to 1, and the problem file indicates a first initial state and a target state of each of the planning layers;

constructing N planning trees corresponding to the planning layers based on the description segments, wherein each of the planning trees has a plurality of state nodes and corresponds to one of the planning layers;

determining a first planning path in the state nodes of each of the planning trees based on a deep learning model, wherein the first planning path of each of the planning trees guides the corresponding planning layer from the corresponding first initial state to the corresponding target state;

generating a first scheduling plan according to the first planning path of a specific planning tree among the planning trees, wherein the first scheduling plan comprises a plurality of action commands assigned with corresponding execution time point;

sequentially issuing the plurality of action commands to the specific application run on the target server according to the first scheduling plan wherein the plurality of the action commands controls the target server to add a piece of program code to a program code of the specific application or remove a piece of program code from the program code of the specific application at the corresponding execution time point;

obtaining an operation observation generated by the specific application in response to a first action command among the action commands;

converting the operation observation of the specific application into an execution state;

determining a second initial state based on the execution state of the specific application in response to determining that the execution state of the specific application indicates that a new scheduling plan is required to be generated and determining a second planning path in the state nodes of each of the planning trees based on the deep learning model, wherein the second planning path of each of the planning trees guides the corresponding planning layer from the corresponding second initial state to the corresponding target state; and generating a second scheduling plan according to the second planning path of the specific planning tree among the planning trees and sequentially issuing a plurality of other action commands to the specific application accordingly, wherein the description segments comprise an $N^{th}$ description segment corresponding to an $N^{th}$ planning layer among the planning layers, the $N^{th}$ description segment comprises a plurality of description sentences corresponding to the $N^{th}$ planning layer, and each of the description sentences is expressed as follows:

precond_N->action_N->effect_N, wherein precond_N is a pre-state, action_N is a specific action command, and effect_N is a result state which may be achieved by executing the specific action command in the pre-state, wherein action_N comprises adding a node to the planning nodes of the $N^{th}$ planning layer or removing a node from the planning nodes of the $N^{th}$ planning layer, and effect_N is a planning node set formed by the planning nodes of the $N^{th}$ planning layer after the specific action command is executed in the pre-state, the $N^{th}$ planning layer corresponds to a code layer of the specific application, and action_N comprises adding the piece of program code to the program code of the specific application or removing the piece of program code from the program code of the specific application, wherein the description segments comprise an $i^{th}$ description segment corresponding to the $i^{th}$ planning layer, the $i^{th}$ description segment comprises a plurality of first description sentences corresponding to the $i^{th}$ planning layer, and each of the first description sentences is expressed as follows:

precond_i->action_i->effect_i, wherein precond_i is a pre-state, action_i is a specific action command, and effect_i is a result state which may be achieved by executing the specific action command in the pre-state;

wherein the first planning node corresponds to one of the first description sentences, and the method further comprises:

determining whether all of the second planning nodes satisfy the second preset conditions corresponding to the $i+1^{th}$ layer before executing action_i corresponding to the first planning node; and executing action_i corresponding to the first planning node in response to determining that all of the second planning nodes satisfy the second preset conditions corresponding to the $i+1^{th}$ layer, otherwise, not executing action_i corresponding to the first planning node;

wherein the first preset conditions met by the first planning node comprise achieving a metric of the $i^{th}$ planning layer, and the method further comprises the following steps:

obtaining input data of the specific application, determining a plurality of reference patterns among a plurality of patterns corresponding to the $i^{th}$ planning layer in response to the input data by executing an input attention function, determining a plurality of feature values corresponding to the plurality of reference patterns by executing conscious attention function and estimating a fitness score corresponding to the $i^{th}$ planning layer according to the plurality of feature values; and determining that the first planning node achieves the metric of the $i^{th}$ planning layer in response to determining that the fitness score corresponding to the $i^{th}$ planning layer is greater than a score threshold of the $i^{th}$ planning layer, wherein the step of estimating the fitness score corresponding to the $i^{th}$ planning layer according to the input data further comprises:

executing an input attention function to find a plurality of reference patterns among a plurality of patterns corresponding to the $i^{th}$ planning layer in response to the input data;

executing a conscious attention function to find a plurality of feature values corresponding to the reference patterns; and determining the fitness score corresponding to the $i^{th}$ planning layer based on the feature values.

12. The method according to claim 11, wherein each of the planning layers has a planning node set, the planning node set of each of the planning layers comprises a plurality of planning nodes, the planning nodes of an $i^{th}$ planning layer among the planning layers comprise a first planning node, the planning nodes of an $i+1^{th}$ planning layer among the planning layers comprise a plurality of second planning nodes corresponding to the first planning node, the first planning node satisfies a plurality of first preset conditions corresponding to the $i^{th}$ planning layer, and all of the planning nodes of a second planning tree satisfy a plurality of second preset conditions of the $i+1^{th}$ layer, wherein i is a positive integer and $N>i\geq 1$.

13. The method according to claim 12, wherein the first preset conditions met by the first planning node comprise that the planning node set of the $i^{th}$ planning layer is not empty and comprise meeting a requirement of the $i^{th}$ planning layer and achieving a metric of the $i^{th}$ planning layer.

14. The method according to claim 13, wherein the requirement of the $i^{th}$ planning layer is determined based on a control flow graph, a data flow graph, a call graph, and a constraint condition graph.

15. The method according to claim 13, wherein the first preset conditions met by the first planning node comprise achieving a metric of the $i^{th}$ planning layer, and the method further comprises the following steps:

obtaining input data of the specific application and estimating a fitness score corresponding to the $i^{th}$ planning layer according to the input data; and determining that the first planning node achieves the metric of the $i^{th}$ planning layer in response to determining that the fitness score corresponding to the $i^{th}$ planning layer is greater than a score threshold of the $i^{th}$ planning layer, wherein the step of estimating the fitness score corresponding to the $i^{th}$ planning layer according to the input data further comprises:

executing an input attention function to find a plurality of reference patterns among a plurality of patterns corresponding to the $i^{th}$ planning layer in response to the input data;

executing a conscious attention function to find a plurality of feature values corresponding to the reference patterns; and determining the fitness score corresponding to the $i^{th}$ planning layer based on the feature values.

16. The method according to claim 11, wherein the planning trees comprise a first planning tree corresponding to an $i^{th}$ planning tree, and the step of determining the first planning path in the state nodes of each of the planning trees based on the deep learning model further comprises:

selecting, by the deep learning model, at least one reference state node following a first state node among the state nodes of the first planning tree based on an operation observation associated with the specific application and a state of the first state node regarding the first state node of the first planning tree;

obtaining the at least one reference state node corresponding to each of the state nodes of the first planning tree and connecting each of the state nodes of the first planning tree and the corresponding at least one reference state node to form at least one candidate path in the first planning tree, wherein the at least one candidate path guides the $i^{th}$ planning layer from the corresponding first initial state to the corresponding target state; and treating one of the at least one candidate path of the first planning tree as the first planning path of the first planning tree.

17. The method according to claim 11, wherein action_i comprises adding a node to the planning nodes of the $i^{th}$ planning layer or removing a node from the planning nodes of the $i^{th}$ planning layer, and effect_i is a planning node set formed by the planning nodes of the $i^{th}$ planning layer after the specific action command is executed in the pre-state.

18. The method according to claim 11, wherein the specific planning tree corresponds to an $N^{th}$ planning layer among the planning layers, the $N^{th}$ planning layer corresponds to a code layer of the specific application, and each of the action commands comprises adding a piece of program code to the specific application or removing a piece of program code from the specific application.

19. The method according to claim 11, further comprising:

in response to determining that a first action command among the action commands is not successfully executed, returning to a previous state and executing the first action command again.

20. The method according to claim 11, wherein the first planning path of the specific planning tree is an unscheduled plan comprising the action commands, and the step of generating the first scheduling plan according to the first planning path of the specific planning tree among the planning trees further comprises:

assigning, by a scheduler, a corresponding execution time point and an execution mode to each of the action commands in the unscheduled plan to generate the first scheduling plan, wherein the step of sequentially issuing the action commands to the specific application further comprises:

sequentially issuing the action commands to the specific application according to the execution time point of each of the action commands.

21. An artificial intelligence planning device, comprising:

a non-transitory storage circuit, storing a code;

a processor, coupled to the storage circuit, accessing the program code for:

obtaining a problem file and a domain file associated with a specific application run on a target server, wherein the domain file comprises N description segments corresponding to N planning layers of the specific application, N is a positive integer greater than or equal to 1, and the problem file indicates a first initial state and a target state of each of the planning layers;

constructing N planning trees corresponding to the planning layers based on the description segments, wherein each of the planning trees has a plurality of state nodes and corresponds to one of the planning layers;

determining a first planning path in the state nodes of each of the planning trees based on a deep learning model, wherein the first planning path of each of the planning trees guides the corresponding planning layer from the corresponding first initial state to the corresponding target state;

generating a first scheduling plan according to the first planning path of a specific planning tree among the planning trees, wherein the first scheduling plan comprises a plurality of action commands assigned with corresponding execution time point;

sequentially issuing the plurality of action commands to the specific application run on the target server according to the first scheduling plan, wherein the plurality of the action commands controls the target server to add a piece of program code to a program code of the specific application or remove a piece of program code from the program code of the specific application at the corresponding execution time point;

obtaining an operation observation generated by the specific application in response to a first action command among the action commands;

converting the operation observation of the specific application into an execution state;

determining a second initial state based on the execution state of the specific application in response to determining that the execution state of the specific application indicates that a new scheduling plan is required to be generated and determining a second planning path in the state nodes of each of the planning trees based on the deep learning model, wherein the second planning path of each of the planning trees guides the corresponding planning layer from the corresponding second initial state to the corresponding target state; and generating a second scheduling plan according to the second planning path of the specific planning tree among the planning trees and sequentially issuing a plurality of other action commands to the specific application accordingly, wherein the description segments comprise an $N^{th}$ description segment corresponding to an $N^{th}$ planning layer among the planning layers, the $N^{th}$ description segment comprises a plurality of description sentences corresponding to the $N^{th}$ planning layer, and each of the description sentences is expressed as follows:

precond_N->action_N->effect_N, wherein precond_N is a pre-state, action_N is a specific action command, and effect_N is a result state which may be achieved by executing the specific action command in the pre-state, wherein action_N comprises adding a node to the planning nodes of the $N^{th}$ planning layer or removing a node from the planning nodes of the $N^{th}$ planning layer, and effect_N is a planning node set formed by the planning nodes of the $N^{th}$ planning layer after the specific action command is executed in the pre-state, the $N^{th}$ planning layer corresponds to a code layer of the specific application, and action_N comprises adding the piece of program code to the specific application or removing the piece of program code from the specific application, wherein the description segments comprise an $i^{th}$ description segment corresponding to the $i^{th}$ planning layer, the $i^{th}$ description segment comprises a plurality of first description sentences corresponding to the $i^{th}$ planning layer, and each of the first description sentences is expressed as follows:

precond_i->action_i->effect_i, wherein precond_i is a pre-state, action_i is a specific action command, and effect_i is a result state which may be achieved by executing the specific action command in the pre-state;

wherein the first planning node corresponds to one of the first description sentences, and the processor is configured to further perform:

determining whether all of the second planning nodes satisfy the second preset conditions corresponding to the $i+1^{th}$ layer before executing action_i corresponding to the first planning node; and executing action_i corresponding to the first planning node in response to determining that all of the second planning nodes satisfy the second preset conditions corresponding to the $i+1^{th}$ layer, otherwise, not executing action_i corresponding to the first planning node;

wherein the first preset conditions met by the first planning node comprise achieving a metric of the $i^{th}$ planning layer, and the method further comprises the following steps:

obtaining input data of the specific application, determining a plurality of reference patterns among a plurality of patterns corresponding to the $i^{th}$ planning layer in response to the input data by executing an input attention function, determining a plurality of feature values corresponding to the plurality of reference patterns by executing conscious attention function and estimating a fitness score corresponding to the $i^{th}$ planning layer according to the plurality of feature values; and determining that the first planning node achieves the metric of the $i^{th}$ planning layer in response to determining that the fitness score corresponding to the $i^{th}$ planning layer is greater than a score threshold of the $i^{th}$ planning layer, wherein the step of estimating the fitness score corresponding to the $i^{th}$ planning layer according to the input data further comprises:

executing an input attention function to find a plurality of reference patterns among a plurality of patterns corresponding to the $i^{th}$ planning layer in response to the input data;

executing a conscious attention function to find a plurality of feature values corresponding to the reference patterns; and determining the fitness score corresponding to the $i^{th}$ planning layer based on the feature values.

* * * * *